A. LOOMIS.
OILING SYSTEM FOR MOTORS.
APPLICATION FILED MAR. 20, 1913.
1,160,298.
Patented Nov. 16, 1915.
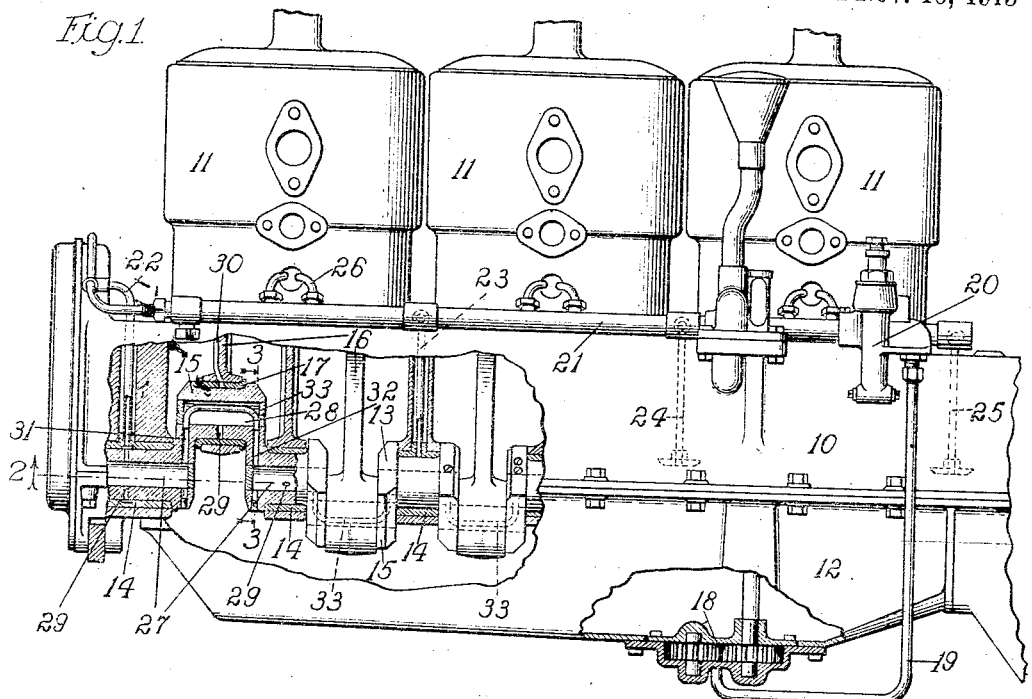
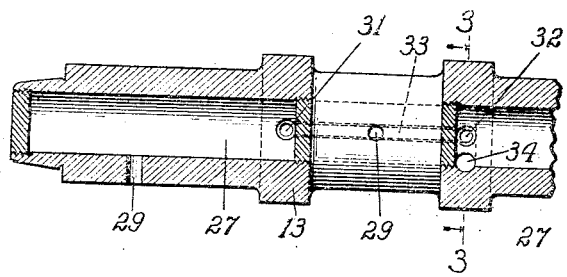
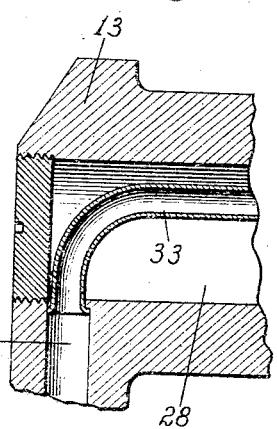
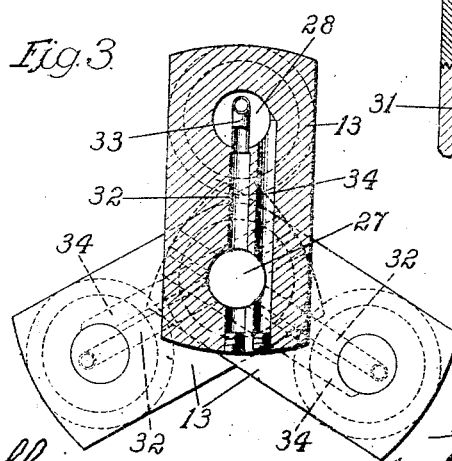
Witnesses:
Clair J. Cote,
L. R. J. Williams
Inventor:
Allen Loomis,
by Milton Ricketts,
Attys

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

OILING SYSTEM FOR MOTORS.

1,160,298.  Specification of Letters Patent.  Patented Nov. 16, 1915.

Application filed March 20, 1913. Serial No. 755,707.

*To all whom it may concern:*

Be it known that I, ALLEN LOOMIS, a citizen of the United States, and resident of Detroit, Wayne county, State of Michigan, have invented certain new and useful Improvements in Oiling Systems for Motors, of which the following is a specification.

This invention relates to oiling systems for motors.

One of the objects of the invention is to provide a positive oiling means for the crank shaft of a multi-cylinder motor.

Another object of the invention is to provide means in a multi-cylinder motor for feeding oil to one of the main bearings of the crank shaft, thence carrying the oil to another of the main bearings through one of the crank pins, and then delivering oil from the second main bearing to the crank pin bearing.

Other objects of the invention will appear from the following description taken in connection with the drawings which form a part of this specification, and in which, Figure 1 is a side elevation of a six-cylinder motor embodying this invention, parts of the crank case and the crank shaft being broken away; Fig. 2 is a section through the forward end of the crank shaft on the line 2 of Fig. 1; Fig. 3 is a transverse section approximately on the line 3—3 of Figs. 1 and 2; and Fig. 4 is an enlarged sectional detail view through one of the crank pins.

Referring to the drawings, 10 represents the motor base or upper half of the crank case, upon which the three cylinder blocks 11 are mounted. These blocks each comprise two cylinders, making this a six-cylinder motor. The lower half of the crank case is represented at 12, and between these halves is supported the crank shaft 13 in bearings 14. In the motor shown there are seven of these main bearings 14, one large one at the front end and one at the rear of each of the crank pins 15 of the crank shaft. There are, of course, six of these cranks or crank pins 15 for the six-cylinder motor shown, and to each of them there is connected a connecting rod 16 through a bearing 17.

Means for feeding oil under pressure directly to some of the main crank shaft bearings 14 comprises an oil pump 18, and a pipe 19 leading to a strainer 20 and from thence to a manifold 21. From the manifold 21 the oil is led through branch pipes 22, 23, 24 and 25 to the main crank shaft bearings 14 at the front and rear ends of the motor and to the main bearings between the cylinder blocks. Branch pipes 26 are shown also for feeding oil directly to the pistons and cylinder walls.

Because of the block cylinder construction, it is impracticable to feed oil directly to the second, fourth and sixth main bearings 14, and the present invention contemplates feeding oil to these bearings indirectly through the crank pins from the other main bearings. A novel method of doing this will now be described.

The crank shaft 13 is drilled out at each of its main bearings as at 27, and each of the crank pins 15 is drilled out as at 28. Openings 29 lead from these drilled out portions of the crank shaft to the bearings 14 and 17 for supplying these bearings with oil under pressure. A tube 30 may also lead from the crank pin bearings to the piston pins, not shown in the drawing. The forward cheek of the crank 15 shown in section in Fig. 1 is drilled, as at 31, and the rearward cheek is drilled, as at 32, and these two drilled channels are connected by a U-shaped tube 33, which is arranged in the opening 28. The method of swaging the ends of the tube 33 in the drilled passages 32 is shown clearly in Fig. 4. The second crank pin 15 is provided with the same drilled openings and tube, so that oil fed through the interior of the first and third main crank shaft bearings is led therefrom through these drills and tubes into the second main crank shaft bearing. Said latter bearing is, of course, provided with an opening 29, which leads from its interior to the bearing 14.

For the purpose of feeding oil from the second main crank shaft bearing to the crank pin bearings at either side thereof, the rearward cheek of the first crank 15 is provided with a drilled passage or conduit 34, and the forward cheek of the second crank is provided with a similar drilled conduit, so that the oil which reaches the interior of the second main bearing and does not pass out through the bearing itself is delivered to the crank pins where it is distributed to the surface of the bearings 17 through the passages 29 and to the piston pin through the tube 30. It will, of course, be understood that the other cranks of the motor are drilled and provided with tubes as are these first two cranks, so that the oil delivered to the third main bearing is distributed from there to both the second and fourth main bearings; the oil delivered to the fifth main bearing is distributed to the fourth and sixth main bearings and the oil delivered to the seventh main bearing passes on to the sixth main bearing. Also, it will be understood that oil which reaches the second, fourth and sixth main bearings is further distributed to all of the crank pin bearings. By thus delivering oil through imperforate conduits and tubes from one of the main bearings to another, it is found that centrifugal force does not interfere with the positive delivery.

A specific embodiment of the invention has been described in detail, which embodiment is deemed to be new and advantageous and will be specifically claimed, but it should be understood that the invention is not limited to the exact details of construction shown, as it will be apparent that changes may be made without departing from the spirit or scope of the invention.

Having thus described my invention, what I claim is:

1. In a motor, the combination with two main bearings for the crank shaft and means for feeding oil to one of said bearings, of a crank shaft mounted in said bearings with a crank pin between said bearings and having means for carrying oil from the bearing to which oil is fed to the other of said bearings, and having also means formed separately from said first means for carrying oil from a main bearing to said crank pin bearing.

2. In a motor, the combination with two main bearings for the crank shaft and means for feeding oil to one of said bearings, of a crank shaft mounted in said bearings with a crank pin between said bearings, said crank shaft having conduits formed therein to lead oil from said oil fed bearing to the other main bearing and from the latter main bearing to said crank pin bearing.

3. In a motor, the combination with two main bearings for the crank shaft and means for feeding oil to one of said bearings, of a crank shaft mounted in said bearings, said crank shaft having conduits formed therein to lead oil through separate channels from said oil fed bearing to the other main bearing and from one of said main bearings to the crank pin bearing respectively.

4. In a motor, the combination with two main bearings for the crank shaft and means for feeding oil to one of said bearings, of a crank shaft mounted in said bearings with a crank pin between said bearings, said crank shaft having a conduit leading from said oil fed bearings to the other main bearing and a second conduit from the latter said bearing to the crank pin bearing.

5. In a motor, the combination with two main bearings for the crank shaft and means for feeding oil to one of said bearings, of a crank shaft mounted in said bearings, said crank shaft being hollow at said main bearings and at the crank pin and being drilled with one conduit from the oil fed bearing to the crank pin and with two conduits from the other main bearing to the crank pin, and a tube connecting the single conduit with one of the other conduits.

6. In a motor, the combination with two main bearings for the crank shaft and means for feeding oil to one of said bearings, of a crank shaft mounted in said bearings and having its crank pin between said bearings, said crank shaft having a conduit leading from said oil fed bearing to the other main bearing passing through said crank pin, and a second conduit from the latter said bearing to the crank pin bearing 7. In a multi-cylinder motor, the combination with a crank case having at least three main bearings therein and means for feeding oil under pressure directly to two outside bearings only of said three bearings, of a crank shaft mounted in said main bearings and having cranks and crank pins on both sides of the middle bearing of said three bearings, said crank shaft having conduits therein leading from the outside main bearings to the middle bearing and conduits leading from the middle bearing to the crank pin bearings.

In testimony whereof I affix my signature in the presence of two witnesses.

ALLEN LOOMIS.

Witnesses:
JOHN D. WILSON,
FRANK L. LLOYD.